(12) United States Patent
Rogers et al.

(10) Patent No.: US 12,401,497 B2
(45) Date of Patent: Aug. 26, 2025

(54) ENCRYPTOR, DECRYPTOR, COMMUNICATIONS SYSTEM, METHODS, COMMUNICATIONS METHOD

(71) Applicants: Steven Rogers, Saint Croix, VI (US); Jonathan Rogers, Saint Croix, VI (US)

(72) Inventors: Steven Rogers, Saint Croix, VI (US); Jonathan Rogers, Saint Croix, VI (US)

( * ) Notice: Subject to any disclaimer, the term of this patent is extended or adjusted under 35 U.S.C. 154(b) by 0 days.

(21) Appl. No.: 18/949,425

(22) Filed: Nov. 15, 2024

(65) Prior Publication Data

US 2025/0158805 A1    May 15, 2025

(30) Foreign Application Priority Data

Nov. 15, 2023  (DE) .................... 10 2023 131 881.0

(51) Int. Cl.
*H04L 9/08* (2006.01)
(52) U.S. Cl.
CPC .......... *H04L 9/0822* (2013.01); *H04L 9/0869* (2013.01)
(58) Field of Classification Search
CPC ............................ H04L 9/0822; H04L 9/0869
See application file for complete search history.

(56) References Cited

U.S. PATENT DOCUMENTS

| | | | |
|---|---|---|---|
| 8,861,722 B2 | 10/2014 | Gammel et al. | |
| 10,608,813 B1 * | 3/2020 | Lazier | G06F 21/602 |
| 10,693,634 B2 | 6/2020 | An et al. | |
| 11,626,977 B2 | 4/2023 | Cain, Jr. et al. | |
| 2010/0316217 A1 | 12/2010 | Gammel | |
| 2018/0241549 A1 | 8/2018 | Qing et al. | |
| 2021/0083865 A1 * | 3/2021 | Obadia | H04L 9/0852 |
| 2022/0173894 A1 | 6/2022 | Cain et al. | |
| 2022/0407688 A1 | 12/2022 | Childe et al. | |
| 2023/0188336 A1 * | 6/2023 | Matthews, Jr. | H04L 63/061 713/171 |
| 2024/0250814 A1 * | 7/2024 | Davidson | G06F 13/20 |
| 2025/0007704 A1 * | 1/2025 | Boutan | H04L 9/0869 |

OTHER PUBLICATIONS

Abdullah, Ako Muhamad. "Advanced encryption standard (AES) algorithm to encrypt and decrypt data." Cryptography and Network Security 16.1 (2017): 11 (Year: 2017).*
Search Report for European Patent Application No. 24213303.1, dated Mar. 13, 2025.
Search Report for International Patent Application No. PCT/EP2024/082544, dated Jan. 28, 2025.

* cited by examiner

*Primary Examiner* — Sangseok Park
(74) *Attorney, Agent, or Firm* — PEARL COHEN ZEDEK LATZER BARATZ LLP

(57) ABSTRACT

An encryptor including circuitry configured to establish a communications link to a decryptor for transmitting an encrypted data payload; obtain a first encryption key via a first channel and a second encryption key via a second channel different from the first channel; encrypt a data payload based on a third encryption key generated based on the obtained first and second encryption key; and transmit the encrypted data payload to the decryptor.

26 Claims, 7 Drawing Sheets

A

B

ENCRYPTOR, DECRYPTOR, COMMUNICATIONS SYSTEM, METHODS, COMMUNICATIONS METHOD

CROSS REFERENCE TO RELATED APPLICATION

This application claims priority to German Patent Application No. 10 2023 131 881.0, filed Nov. 15, 2023, which is hereby incorporated by reference in its entirety.

FIELD OF THE INVENTION

The present disclosure generally pertains to an encryptor, a decryptor, a communications system, a method for encrypting a data payload, a method for decrypting an encrypted data payload, and a communications method.

BACKGROUND OF THE INVENTION

Generally, encrypted communications in a (computer) network are known. Many business, government and personal users of the Internet use encryption to prevent a third-party from observing or exploiting their communications.

However, the Internet has an open communications architecture in which the complete packets are not encrypted in a data transmission, since the Internet relies on routing information to enable the packets to reach their intended destination. As there are many potential endpoints to send information to, it is necessary for the network infrastructure to be able to read the destination and source address information for each packet. This address information is used to direct the packets to the correct endpoint. If the address were encrypted, the routing mechanism would not be able to work.

In addition, the packet transmission systems ("protocols") are used to ensure that the complete data is transmitted correctly and as fast as possible. These protocols often consist of lots of back-and-forth messages that signal, for example, each end as to the status of packets, the retransmissions needed to deliver lost packets, the need to slow down or speed up a delivery of a data block. These packets often must also be transmitted in an unencrypted form.

In some cases, Internet point-to-point packet traffic channels may be encrypted. With this technique, the entire data channel is encrypted between Internet routing nodes such that a packet is fully encrypted as it leaves a router, and it is decrypted as it is received at the next router. The received packet must be decrypted prior to submission to the next Internet router. In this way, the router can read the packet address and send each packet in the correct direction.

This form of Internet encryption is typically called "link encryption". This form of encryption may, for instance, be performed when both ends of a link are owned or controlled by the same operator. That way, they may ensure that the encryption and decryption functions match.

However, for bulk encryption systems this may be difficult to implement and manage. The benefit may be that a potential third-party would not be able to exploit either the contents of a packet or to learn of its destination.

In general, however, some users of the Internet, for example government and business users, may require that their data be accessible only to the intended recipient. This means that the data packet must be encrypted at the source and decrypted at the intended endpoint.

In the past, (symmetric) data encryptions schemes have relied on complex mathematical algorithms to perform the encryption function. The reason for this is that data transmission was relatively costly and, thus, the encryption system should be efficient. This translated to the need for algorithms that could rely on short keys or number seeds that then could generate very large pseudo-random numbers. The short key in combination with the complex algorithm would enable the generation of a large final key that effectively could combine with big data files to produce the cipher text ("cipher text" is the encrypted data) that is actually sent to a distant location.

This approach—having a relatively short key combined with a very complex algorithm—may allow the keys needed to encrypt and then to decrypt the received information to be short and, thus, easier to distribute.

Many other encryption schemes are based on "asymmetric key encryption" which may allow to make the distribution of the keys simple. They generally rely on a mathematical function that is difficult to solve in one direction but relatively simple to implement in another. In these systems, an encryption key would be different than a decryption key and a receiver could actually send an encryption key to the sender such that the sender could encrypt the data.

Because of the "asymmetric" complex algorithm, the decryption key could not be guessed or discovered by knowing the encryption key. Thus, the receiver could send the encryption key without encryption or protection. Only the receiver would have the decryption key. This way, anyone could send a file but only the receiver would be able to decrypt such a file.

However, the asymmetric methods must of necessity be especially complex and mathematically robust and the encryption and decryption keys should be rather long. As a result, it may be impractical to transmit actual data at volume using asymmetric methods.

Moreover, the computation of the encryption and decryption keys in asymmetric methods is based on a complex algorithm which relies on a mathematical problem that would supposedly take a typical computer many years to solve by brute force computation.

However, a new computing technology is emerging which is typically called "Quantum Computing". A quantum computer is supposed to quickly solve the very mathematical problem needed to decrypt the asymmetric key system which may be a very serious development for encrypted communications over a (computer) network.

Another use case of asymmetric encryption methods concerns the encryption and transmission of a final (symmetric) key which is then used for encrypting data in the further communications such that the actual data is not encrypted using the asymmetric method.

However, such a key distribution scheme based on asymmetric methods may have the same vulnerability to potential (future) attacks with quantum computing by which the asymmetric encryption is quickly overcome and the final symmetric key for the future communications is obtained by a third-party.

Nonetheless, in general, the asymmetric methods make it easy for users and providers of data to interact and use encryption even though they may not have any prior knowledge of each other. A well-known version of this may be SSL ("Secure Sockets Layer").

However, for SSL, a third-party could potentially insert themselves into the middle of a communications session. What they could do is to intercept the unencrypted key from the receiver and also do the same from the transmitter. Then, the third-party would be able to simulate a separate encrypted communications session with each end of the communications. The third-party could decrypt all communications from each end then encrypt the same communication, as was sent to the other end. The trouble is that the original sender and receiver would believe that they were having a protected communications session. In fact, they were not. This is called a "Man-in the Middle" (MIM) attack.

Although there exist techniques for encrypted communications, it is generally desirable to improve the existing techniques.

SUMMARY OF THE INVENTION

According to a first aspect the disclosure provides an encryptor comprising circuitry configured to:
  establish a communications link to a decryptor for transmitting an encrypted data payload;
  obtain a first encryption key via a first channel and a second encryption key via a second channel different from the first channel;
  encrypt a data payload based on a third encryption key generated based on the obtained first and second encryption key; and
  transmit the encrypted data payload to the decryptor.

According to a second aspect the disclosure provides a decryptor comprising circuitry configured to:
  establish a communications link to an encryptor for receiving an encrypted data payload;
  obtain a first encryption key via a third channel and a second encryption key via a fourth channel different from the third channel;
  receive the encrypted data payload; and
  decrypt the received encrypted data payload based on a third encryption key generated based on the obtained first and second encryption key.

According to a third aspect the disclosure provides a communications system, comprising:
  an encryptor including circuitry configured to:
    establish a communications link to a decryptor for transmitting an encrypted data payload,
    obtain a first encryption key via a first channel and a second encryption key via a second channel different from the first channel,
    encrypt a data payload based on a third encryption key generated based on the obtained first and second encryption key,
    transmit the encrypted data payload to the decryptor; and
  the decryptor including circuitry configured to:
    establish the communications link to the encryptor for receiving the encrypted data payload,
    obtain the first encryption key via a third channel and the second encryption key via a fourth channel different from the third channel,
    receive the encrypted data payload,
    decrypt the received encrypted data payload based on the third encryption key generated based on the obtained first and second encryption key.

According to a fourth aspect the disclosure provides a method for encrypting a data payload, comprising:
  establishing a communications link to a decryptor for transmitting an encrypted data payload;
  obtaining a first encryption key via a first channel and a second encryption key via a second channel different from the first channel;
  encrypting a data payload based on a third encryption key generated based on the obtained first and second encryption key; and
  transmitting the encrypted data payload to the decryptor.

According to a fifth aspect the disclosure provides a method for decrypting an encrypted data payload, comprising:
  establishing a communications link to an encryptor for receiving an encrypted data payload;
  obtaining a first encryption key via a third channel and a second encryption key via a fourth channel different from the third channel;
  receiving the encrypted data payload; and
  decrypting the received encrypted data payload based on a third encryption key generated based on the obtained first and second encryption key.

According to a sixth aspect the disclosure provides a communications method, comprising:
  establishing a communications link between an encryptor and a decryptor;
  obtaining, by the encryptor, a first encryption key via a first channel and a second encryption key via a second channel different from the first channel;
  obtaining, by the decryptor, the first encryption key via a third channel and the second encryption key via a fourth channel different from the third channel;
  encrypting a data payload based on a third encryption key generated based on the obtained first and second encryption key;
  transmitting the encrypted data payload to the decryptor;
  receiving the encrypted data payload; and
  decrypting the received encrypted data payload based on the third encryption key generated based on the obtained first and second encryption key.

Further aspects are set forth in the dependent claims, the drawings and the following description.

BRIEF DESCRIPTION OF THE DRAWINGS

Embodiments are explained by way of example with respect to the accompanying drawings, in which.

DETAILED DESCRIPTION OF THE INVENTION

Figure 1:
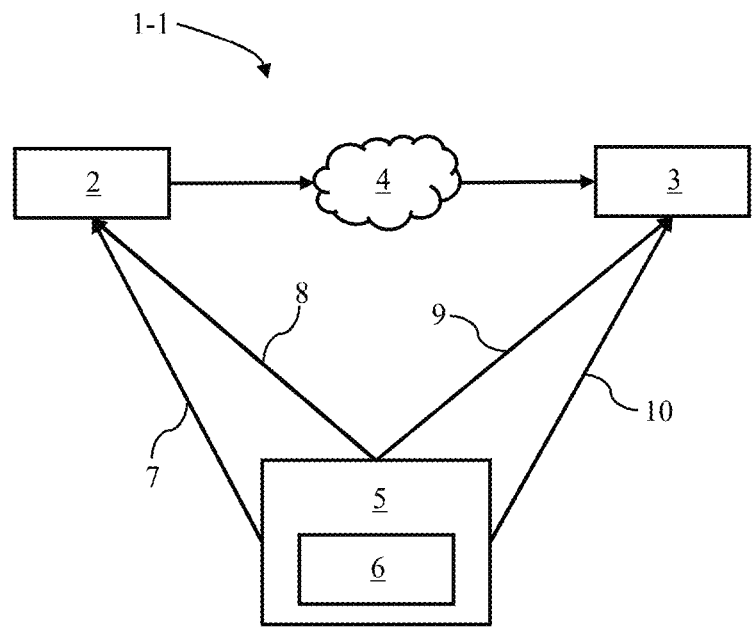
FIG. 1 schematically illustrates in a block diagram in FIG. 1A an embodiment of a communications system and in FIG. 1B an embodiment of a communications system.
Figure 1:
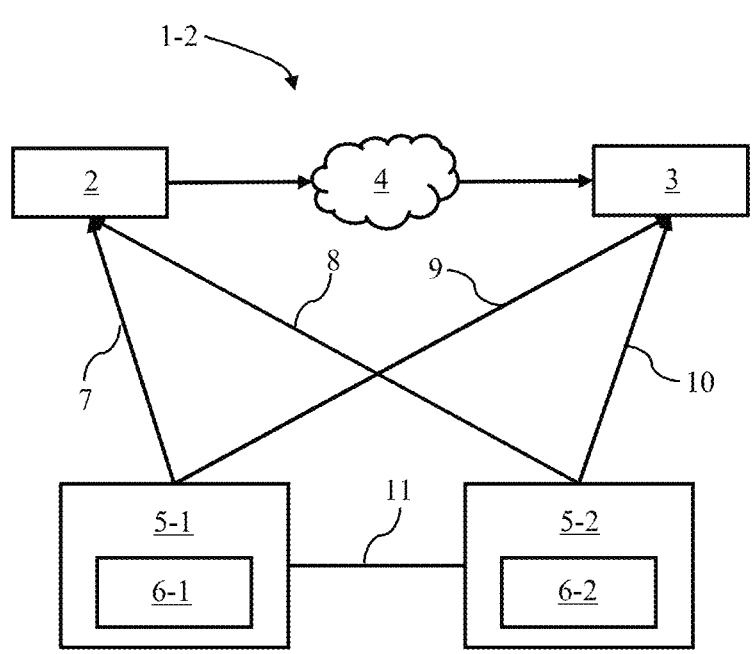

Before a detailed description of the embodiments under reference of FIG. 1 is given, general explanations are made.

As mentioned in the outset, asymmetric encryption methods may be in some cases prone to "Man-in-the-Middle" ("MIM") attacks in which the attacker inserts themselves in the middle of the communications session.

It has been recognized that symmetric encryption methods may not be prone to such MIM attacks.

However, key distribution in symmetric encryption methods is a problem. For example, as mentioned above, the encryption keys may be distributed by asymmetric methods, but this may have the vulnerability to attacks with quantum computing. A list with a number of encryption keys which is send by mail may be copied during the delivery.

It has thus been recognized that the encryption key may be generated based on two different keys obtained via two different channels. A corresponding symmetric encryption scheme is proposed and described herein.

Hence, in some embodiments, a data payload to be transmitted from computer A over a (computer) network—e.g., the Internet, a mobile telecommunications system, a wide area network ("WAN"), a local area network ("LAN"), etc. —to computer B may be encrypted with an encryption key that is generated based on two different encryption keys received over different channels, e.g., from a key generation center ("KGC").

In this way, a potential attacker would have to intercept two different channels to get the encryption keys used for the communications between computer A and computer B, thereby improving security of the communications.

Some embodiments pertain to an encryptor, wherein the encryptor includes circuitry configured to:
  establish a communications link to a decryptor for transmitting an encrypted data payload;
  obtain a first encryption key via a first channel and a second encryption key via a second channel different from the first channel;
  encrypt a data payload based on a third encryption key generated based on the obtained first and second encryption key; and
  transmit the encrypted data payload to the decryptor.

Accordingly, some embodiments pertain to a decryptor, wherein the decryptor includes circuitry configured to:
  establish a communications link to an encryptor for receiving an encrypted data payload;
  obtain a first encryption key via a third channel and a second encryption key via a fourth channel different from the third channel;
  receive the encrypted data payload; and
  decrypt the received encrypted data payload based on a third encryption key generated based on the obtained first and second encryption key.

Hence, some embodiments pertain to a communications system, wherein the communications system includes:
  an encryptor, wherein the encryptor includes circuitry configured to:
    establish a communications link to a decryptor for transmitting an encrypted data payload,
    obtain a first encryption key via a first channel and a second encryption key via a second channel different from the first channel,
    encrypt a data payload based on a third encryption key generated based on the obtained first and second encryption key,
    transmit the encrypted data payload to the decryptor; and
  the decryptor, wherein the decryptor includes circuitry configured to:
    establish the communications link to the encryptor for receiving the encrypted data payload,
    obtain the first encryption key via a third channel and the second encryption key via a fourth channel different from the third channel,
    receive the encrypted data payload,
    decrypt the received encrypted data payload based on the third encryption key generated based on the obtained first and second encryption key.

Generally, the encryptor and the decryptor communicate over a (computer) network such as the Internet, a mobile telecommunications system, a WAN, a LAN, a satellite network, telephone network, direct optical network, etc. via a wired or wireless connection.

The encryptor and the decryptor establish a communications link between each other for transmitting the data payload(s) from the encryptor to the decryptor. This communications link may be referred to as message communications channel.

Thus, in some embodiments, the communications link or the message communications channel, is a classical communications channel or classical communications link. A classical communications channel or classical communications link is only able to transmit classical information. Hence, in some embodiments, the communications link or the message communications channel is a classical communications link or classical communications channel which is only able to transmit classical information. In contrast, a non-classical communications channel or quantum channel is also able to transmit quantum information.

The message communications channel may be any kind of logical communications channel—in particular a logical classical communications channel—provided wirelessly or wired or a combination thereof, for example, via one or more (computer) network elements.

The message communications channel may provide connection-oriented communications. The connection-oriented communications may be provided on one or more network protocol layers such as the network layer (e.g., virtual connections), the transport layer, the session layer or the application layer.

For example, the message communications channel may be a mobile telecommunications channel or a TCP ("Transmission Control Protocol") channel or a Voice over IP ("VoIP") channel or a VPN ("Virtual Private Network") channel or a HTTPS ("Hypertext Transfer Protocol Secure") link.

Thus, in some embodiments, the message communications channel corresponds to the communications link. In such embodiments, the encrypted data payload is transmitted in a data transmission via the communications link.

The encryptor may be or may include or may be implemented by a dedicated hardware device, a computer, a (computer) network element—such as a modem, a switch, a router, a bridge, a hub, a repeater, a server, a base station, etc. —, a mobile terminal—such as a smartphone, a tablet, a laptop, etc. —, a desktop computer, or the like.

The decryptor may be or may include or may be implemented by a dedicated hardware device, a computer, a (computer) network element—such as a modem, a switch, a router, a bridge, a hub, a repeater, a server, a base station, etc. —, a mobile terminal—such as a smartphone, a tablet, a laptop, etc. —, a desktop computer, or the like.

The encryptor and the decryptor may operate in one communication direction—e.g., any data payload is transmitted from the encryptor to the decryptor—or may operate in both directions such that a data payload may be transmitted also from the decryptor to the encryptor via the communications link such that an encryptor may also function as a decryptor and a decryptor may also function as an encryptor.

The communications system may be operated on multiple simultaneous encryption sessions which may support multiple applications which may be used by multiple users.

Any circuitry herein may include or may be implemented by one or more processors—such as an application processor, a central processor, a graphical processors, a digital signal processor—, an application specific integrated circuit, a field-programmable gate array, one or more (computer) memories—such as random-access memory ("RAM"), volatile memory or non-volatile memory —, one or more (data) buses, one or more network interfaces for data communications over a (computer) network via a wired or wireless connection.

Any circuitry herein may include or may be implemented by or may be based on typical electronic components configured to achieve the functions as described herein.

Any communications link herein may be provided via one or more (computer) network elements such as modems, switches, routers, bridges, hubs, repeaters, servers, base stations, etc. and may be provided wired or wirelessly or by a combination thereof.

The data payload may be any kind of data. The data payload may, for example, represent (a part of) application data of various applications such as messenger, email, file transfer, telephone, music streaming, video streaming applications or the like. The data payload may typically be transmitted in a single packet or data frame or in a block transfer. The data payload may be part of a data stream, wherein each data payload of the data stream is encrypted.

As used herein, the first channel and the second channel refer to the encryptor and the third channel and the fourth channel refer to the decryptor. Each of these channels may be referred to as a key distribution or a key provisioning or a key communications channel.

Any of the first, second, third channel and fourth channel may be any kind of type of delivery for delivering the respective encryption key to the encryptor or decryptor such as a delivery by a post or courier service, a data transmission via a communications link, or the like.

If, for example, an encryption key is delivered by a post or a courier service, the encryption key may be stored on any memory device such as an USB ("Universal Serial Bus") stick, a disc (e.g., a CD ("Compact Disc")), a hard disk, or the like. The encryption key may further be stored on a separate computer which may be connected to the encryptor or decryptor. The encryption key may further be stored on a dedicated hardware logic and memory which may be connected to the encryptor or decryptor.

The channels may be different with respect to the post or courier service or the routes or the schedule when the encryption keys are delivered on a memory device, or with respect to the used type of communications link (e.g., a communications link via a mobile communications system is a different type of communications link than via a wireless local area network, since the access technology is different). Moreover, for example, the first and third channel may be based on a post delivery and the second and fourth channel may be based on a communications link. Thus, in some embodiments, the delivery of the encryption key via a memory chip, USB device, or any other electronic (or physical) means may also be considered as a communication of the encryption key via a (key communications) channel.

Generating the third encryption key based on the obtained first and second encryption key may include any kind of process or transformation such as an exclusive-or transformation, a concatenation, interleaving or the like. Generating the third encryption key based on the obtained first and second encryption key may include using a first part of the first encryption key and a second part of the second encryption key to form the third encryption key, for example, based on exclusive-or transformation, a concatenation, interleaving or the like.

Hence, in some embodiments, the third encryption key is generated based on an exclusive OR transformation of the first and second encryption key.

Encrypting the data payload may include any computational or transformational algorithm or process to perform the encryption, for example, the encryption may be a bit-by-bit exclusive-or transformation with the unencrypted data payload. The exclusive-or transformation is simple and effective with low computational overhead and typically goes within a clock cycle.

Alternatively, or in combination with the exclusive-or transformation, encrypting the data payload may include various other algorithms such as Advanced Encryption Standard ("AES"), various public key infrastructure ("PKI"), government algorithms, private algorithms, etc., wherein these algorithms then use the first and second encryption key.

Correspondingly, decrypting the encrypted data payload may include any computational or transformational algorithm or process to perform the decryption, for example, the decryption may be a bit-by-bit exclusive-or transformation with the encrypted data payload. The exclusive-or transformation is simple and effective with low computational overhead and typically goes within a clock cycle.

Alternatively, or in combination with the exclusive-or transformation, decrypting the encrypted data payload may include various other algorithms such as Advanced Encryption Standard ("AES"), various public key infrastructure ("PKI"), government algorithms, private algorithms, etc., wherein these algorithms then use the first and second encryption key.

Instead of generating a third encryption key, in some embodiments, the data payload is encrypted at first with or based on the first encryption key and this result is then further encrypted with or based on the second encryption key (e.g., as mentioned above, exclusive-or transformation, AES, etc.). In such embodiments, the encrypted data payload is decrypted at first with the second encryption key and this result is then further decrypted with the first encryption key.

Hence, in some embodiments, the circuitry of the encryptor is configured to encrypt a data payload based on the obtained first and second encryption key.

Accordingly, in some embodiments, the circuitry of the decryptor is configured to decrypt an encrypted data payload based on the obtained first and second encryption key.

Generally, it is proven that symmetric encryption is unbreakable when the encryption key has the same length as the data to be encrypted (e.g., a data payload), and, in particular, when the encryption key is based on a true random number as is also discussed further below.

Hence, in some embodiments, the first and second encryption key may have the same length as the data payload. In some embodiments, the concatenation of the first and second encryption key may have the same length as the data payload.

In some embodiments, the first and second encryption key are only used once.

Generally, the encryptor and the decryptor have the same third encryption key, thereby providing a method or scheme for symmetric encryption of the data payload(s) transmitted via the communications link, i.e. via the message communications channel.

Generally, the present disclosure may equally apply to more than two encryption keys based on which a data payload is encrypted. The two or more encryption keys may be received via different channels (or the same channels).

As mentioned in the outset, some symmetric encryption methods rely on encryption keys that are generated using a short key in combination with a complex algorithm to generate a large Pseudo-Random Number ("PRN"). However, PRNs are not really random and can be mathematically recovered.

It has been recognized that encryption keys may thus be based on true random numbers ("RNs"), since they are unbreakable in the sense that they cannot be mathematically recovered as the PRNs.

Hence, in some embodiments, the first encryption key includes a first true random bit distribution, and the second encryption key includes a second true random bit distribution.

Generally, RN generators are known.

In some embodiments, the true RN is generated based on a physical process. The physical process may include at least one of thermal noise, photoelectric effect, quantum phenomenon.

The encryptor and the decryptor may store more than one encryption key for each of the first and encryption key and/or the first and second encryption key may be a very large key providing key material for a plurality of encryption and decryption operations.

Moreover, as mentioned above, various encryption algorithms may be used.

Hence, in some embodiments, the circuitry of the encryptor is further configured to include encryption information in the transmission of the encrypted data payload.

Accordingly, in some embodiments, the circuitry of the decryptor is further configured to detect encryption information included in the received transmission of the encrypted data payload.

The encryption information may be included in a header of a packet or in a header of a data frame carrying the encrypted data payload. The encryption information may be—together with the encrypted data payload—included in a data payload of a packet or in a data payload of a data frame. The encryption information may be transmitted alone before or after transmitting the encrypted data payload. The encryption information may be included in a block transfer.

In some embodiments, the encryption information includes at least one of: a first data element identifying which type of encryption process is used for encrypting the data payload, a second data element identifying the first and second encryption key, and a third data element identifying parts of the first and second encryption key to be used for generating the third encryption key.

In some embodiments, the encryption information includes a fourth data element identifying which type of process is used for generating the third encryption key based on the first and the second encryption key, for example, whether the third encryption key is generated by exclusive OR transformation or concatenation or the like.

In some embodiments, the encryption information includes a message authentication code.

As used herein, the communications link refers to a communications link between the encryptor and the decryptor. As mentioned above, this communications link may be referred to as message communications channel. In some embodiments, as already mentioned above, the message communications channel may be established via a (computer) network such as the Internet, a mobile telecommunications system, a WAN, a LAN, a satellite network, telephone network, direct optical network, etc. via a wired or wireless connection, or the like. But, in some embodiments, the message communications channel is also established physically, e.g., via a (hand) delivered message being encrypted with the encryption key (e.g. via a post or courier service or the like).

As used herein, the second communications link and the third communications link refer to the encryptor which may be, for example, different communications links between the encryptor and an apparatus providing the encryption keys. As mentioned above, each of these communications links may be referred to as a key distribution or a key provisioning or a key communications channel.

As used herein, the fourth communications link and the fifth communications link refer to the decryptor which may be, for example, different communications links between the decryptor and an apparatus providing the encryption keys. As mentioned above, each of these communications links may be referred to as a key distribution or a key provisioning or a key communications channel.

Any of the second, third, fourth and fifth communications link may be established via a (computer) network such as the Internet, a mobile telecommunications system, a WAN, a LAN, a satellite network, telephone network, direct optical network, etc. via a wired or wireless connection, or the like.

In some embodiments, the communications system further includes an apparatus, wherein the apparatus includes circuitry configured to:
  establish a second communications link with the encryptor as the first or second channel to provide the first or second encryption key, respectively,
  establish a fourth communications link with the decryptor as the third or fourth channel to provide the first or second encryption key, respectively.

The apparatus may be a computer, a network entity, a network element, a server, a cloud service, or the like.

The apparatus may be considered as an "encryption key generation and/or distribution center".

In such embodiments, at least one of the first and second channel and at least one of the third and fourth channel is a communications link such that at least one of the encryption keys is obtained via a data transmission.

Any of the second and third and fourth and fifth communications link or any of the key communications channels, may be a classical communications link or classical communications channel. A classical communications link or classical communications channel is only able to transmit classical information. Hence, in some embodiments, any of the second and third and fourth and fifth communications link or any of the key communications channel is a classical communications link or classical communications channel which is only able to transmit classical information. In contrast, a non-classical communications channel or quantum channel is also able to transmit quantum information.

In some embodiments, each key communications channel is a classical communications channel.

A key communications channel may be any kind of logical communications channel—in particular logical classical communications channel—provided wirelessly or wired or a combination thereof, for example, via one or more (computer) network elements.

A key communications channel may provide connection-oriented communications. The connection-oriented communications may be provided on one or more network protocol layers such as the network layer (e.g., virtual connections), the transport layer, the session layer or the application layer.

For example, a key communications channel may be a mobile telecommunications channel or a TCP ("Transmission Control Protocol") channel or a VPN ("Virtual Private Network") channel or a HTTPS ("Hypertext Transfer Protocol Secure") link.

Thus, in some embodiments, any key communications channel corresponds to a communications link. In such embodiments, the respective encryption key is transmitted in a data transmission via the respective communications link.

In some embodiments, the circuitry of the encryptor is configured to obtain or receive the first or the second encryption key via the second communications link from the apparatus, wherein the first or the second encryption key is transmitted directly via the second communications link. In other words, the data representing the first or the second encryption key are transmitted via the second communications link.

In some embodiments, the circuitry of the decryptor is configured to obtain or receive the first or the second encryption key via the fourth communications link from the apparatus, wherein the first or the second encryption key is transmitted directly via the fourth communications link. In other words, the data representing the first or the second encryption key are transmitted via the fourth communications link.

In some embodiments, the circuitry of the encryptor is further configured to authenticate with the apparatus.

The authentication may be performed in various ways. The authentication may include, for example, that the encryptor transmits an encryptor identifier to the apparatus or that the encryptor has a specific network address or that the encryptor requests the encryption key via a specific port or that the encryptor provides a credential to the apparatus for authentication. The encryptor may transmit a digital certificate to the apparatus in an authentication procedure, wherein the digital certificate has been issued by the apparatus for the encryptor and transmitted to the encryptor in a registration procedure and the digital certificate is signed with a private key of the apparatus or a private key associated with the apparatus.

The authentication may require that the encryptor is registered with the apparatus.

In some embodiments, the circuitry of the decryptor is further configured to authenticate with the apparatus.

The authentication may be performed in various ways. The authentication may include, for example, that the decryptor transmits a decryptor identifier to the apparatus or requests the encryption key via a specific port or that the decryptor provides a credential to the apparatus for authentication. The decryptor may transmit a digital certificate to the apparatus in an authentication procedure, wherein the digital certificate has been issued by the apparatus for the decryptor and transmitted to the decryptor in a registration procedure and the digital certificate is signed with a private key of the apparatus or a private key associated with the apparatus.

The authentication may require that the decryptor is registered with the apparatus.

In some embodiments, the communications system further includes an apparatus, wherein the apparatus includes circuitry configured to:
establish a second communications link with the encryptor as the first channel and a third communications link with encryptor as the second channel,
establish a fourth communications link with the decryptor as the third channel and a fifth communications link with the decryptor as the fourth channel.

In some embodiments, the circuitry of the encryptor is configured to obtain or receive the first encryption key via the second communications link from the apparatus and the second encryption key via the third communications link from the apparatus, wherein the first and the second encryption keys are transmitted directly via the second communications link and the third communications link, respectively. In other words, the data representing the first and the second encryption key are transmitted via the second communications link and the third communications link, respectively.

In some embodiments, the circuitry of the decryptor is configured to obtain or receive the first encryption key via the fourth communications link from the apparatus and the second encryption key via the fifth communications link from the apparatus, wherein the first and the second encryption keys are transmitted directly via the fourth communications link and the fifth communications link, respectively. In other words, the data representing the first and the second encryption key are transmitted via the fourth communications link and the fifth communications link, respectively.

In some embodiments, the second communications link is established via a wireless local area network, the third communications link is established via a mobile telecommunications system, the fourth communications link is established via a wireless local area network, and the fifth communications link is established via a mobile telecommunications system.

In general, any communications link herein, i.e., the message communications channel and any key communications channel, may be provided or established, for example, via a wireless local area network or a mobile telecommunications system, as mentioned above.

As mentioned above, a data payload may be part of a data stream, for example, a large file may be transferred from a first server (using the encryptor) to a second server (using the decryptor) over a packet-switched (computer) network such that multiple packets including multiple data payloads have to be transmitted over the communications link for transferring the whole file. In such a case, the encryption key may not be large enough for the whole transmission and, as mentioned above, a symmetric encryption key may only be used once (such that it is unique for each transmission) and may have the same (bit) length as the data payload.

It has been recognized that the encryption key may be provided as part of an encryption key stream.

Hence, in some embodiments, the data payload is part of a data stream, the first encryption key is part of a first encryption key stream, and the second encryption key is part of a second encryption key stream, and the circuitry of the apparatus is further configured to:
provide a first encryption key stream to the encryptor via the second communications link and to the decryptor via the fourth communications link,
provide a second encryption key stream to the encryptor via the third communications link and to the decryptor via the fifth communications link.

Correspondingly, in some embodiments, the circuitry of the encryptor is further configured to:

receive the first encryption key stream via the second communications link and the second encryption key stream via the third communications link from the apparatus, encrypt the data stream based on a third encryption key stream generated based on the first and second encryption key stream, transmit the encrypted data stream to the decryptor.

Correspondingly, in some embodiments, the circuitry of the decryptor is further configured to:

receive the first encryption key stream via the fourth communications link and the second encryption key stream via the fifth communications link from the apparatus, receive the encrypted data stream, decrypt the received encrypted data stream based on a third encryption key stream generated based on the first and second encryption key stream.

Each of the encryption key streams includes a plurality of (different) encryption keys provided as a continuous flow. The first encryption key stream includes plurality of first encryption keys provided as a continuous flow. The second encryption key stream includes plurality of second encryption keys provided as a continuous flow. Typically, in some embodiments, each first encryption key and each second encryption key is only used once.

Similarly, the encrypted data stream includes a plurality of (different) data payloads provided as a continuous flow, wherein each data payload is encrypted based on one first encryption key from the plurality of first encryption keys and one second encryption key from the plurality of second encryption keys. For example, each data payload is encrypted based on a third encryption key generated based on one first encryption key and one second encryption key.

The apparatus may be a single computer or server or network entity or network element or cloud service or may include two separate computers or servers or network entities or network elements or cloud services for providing the first and second encryption key stream, respectively.

Hence, in some embodiments, the apparatus includes a first apparatus establishing the second and fourth communications link and a different separate second apparatus establishing the third and fifth communications link.

As the encryptor and the decryptor must use the same encryption keys for encryption and decryption, respectively, for a given data payload of the data stream, the apparatus determines an identifier (synchronization indication) for each encryption key in each encryption key stream for allowing the encryptor and the decryptor to synchronize encryption key usage.

Hence, in some embodiments, the circuitry of the apparatus is further configured to include synchronization information in the first and second encryption key stream to be used for obtaining encryption information by the encryptor and for processing the encryption information by the decryptor.

Accordingly, in some embodiments, the circuitry of the encryptor is further configured to detect the synchronization information in the first and second encryption key stream for obtaining, based on the synchronization information, encryption information to be included in the transmission of the encrypted data stream.

Accordingly, in some embodiments, the circuitry of the decryptor is further configured to detect synchronization information in the first and second encryption key stream to be used for processing encryption information included in the transmission of the encrypted data stream.

The synchronization information may be included in a header of a packet or in a header of a data frame carrying the encryption key. The synchronization information may be—together with the encryption key—included in a data payload of a packet or in a data payload of a data frame. The synchronization information may be transmitted alone before or after transmitting the encryption key. The synchronization information may be included in a block transfer.

In some embodiments, the synchronization information includes multiple synchronization indications according to at least one of a predetermined timing pattern and a code pattern.

The timing pattern may include multiple time stamps corresponding to the transmission time points of each encryption key of the encryption key stream.

The code pattern may include multiple numbers for identifying each encryption key of the encryption key stream.

As mentioned above, it may be desirable to provide encryption keys based on true RN.

Hence, in some embodiments, the circuitry of the apparatus is further configured to generate true random numbers.

In some embodiments, the true random numbers are generated by controlling at least one true random number generator.

In some embodiments, the true random number generator is configured to generate the true random number based on a physical process.

In some embodiments, the physical process includes at least one of: thermal noise, photoelectric effect, quantum phenomenon.

In some embodiments, the first and second encryption key stream is generated based on the at least one true random number generator.

In some embodiments, communications between the apparatus and at least one of the encryptor and the decryptor is encrypted. In such embodiments, the key communications channels of at least one of the encryptor and the decryptor channels are encrypted.

The communications (the key communications channels) may be encrypted based on asymmetric encryption methods. In other words, the communications (the key communications channels) may be encrypted based on asymmetric encryption. For example, the encryptor or decryptor may use the public key of the apparatus, for example transmitted in a digital certificate, and the apparatus may use the public key of the encryptor or decryptor, for example transmitted in a digital certificate, to encrypt the communications.

The apparatus may generate a public/private key pair for the registered encryptor and transmit the private key to the encryptor and may use the public key associated with the encryptor in subsequent communications. The encryptor may generate a public/private key pair and may provide the public key to the apparatus when the encryptor is registered with the apparatus or in a registration procedure. As mentioned above, the apparatus may transmit a digital certificate to the encryptor in a registration procedure which the encryptor then transmits in an authentication procedure to the apparatus such that the apparatus may use the public key of the encryptor in subsequent communications.

Similarly, the apparatus may generate a public/private key pair for the registered decryptor and transmit the private key to the decryptor and may use the public key associated with the decryptor in subsequent communications. The decryptor may generate a public/private key pair and may provide the public key to the apparatus when the decryptor is registered with the apparatus or in a registration procedure. As mentioned above, the apparatus may transmit a digital certificate to the decryptor in a registration procedure which the decryptor then transmits in an authentication procedure to the apparatus such that the apparatus may use the public key of the decryptor in subsequent communications.

The communications (the key communications channels) may be encrypted based on symmetric encryption methods such as a session key or symmetric keys based on PRNs. In other words, the communications (the key communications channels) may be encrypted based on symmetric encryption.

As mentioned above, a large PRN is typically generated based on a short key in combination with a complex algorithm. Hence, in some embodiments, for example, an administrator issues via courier service, e.g., after registration, a list of short keys to someone who is in charge of the at least one of the encryptor and decryptor (e.g., on a memory device) such that the at least one of the encryptor and decryptor may generate a symmetric encryption key for communications with the apparatus on the fly.

The complex algorithm to be used for generating the PRNs based on the short keys may be determined when a communications link (a key communications channel) is established between the encryptor or decryptor and the apparatus.

The short keys for generating the PRNs may be provided via an established communications link (a key communications channel), wherein the short keys may be encrypted based on asymmetric encryption methods.

Thus, generally, the communications of the encryption key(s) (the key communications channels) may be encrypted based on a combination of symmetric and asymmetric encryption methods. In other words, the communications (the key communications channels) may be encrypted based on a combination of symmetric encryption and asymmetric encryption. In some embodiments, also the communications of the data payload (the message communications channel) may be encrypted based on a combination of symmetric and asymmetric encryption methods.

In some embodiments, the circuitry of the apparatus is further configured to provide the first and second encryption key stream as a service.

The encryptor may thus request an encryption key stream for communications with a decryptor. The request may include the network address of the decryptor. At least one of the encryptor and the decryptor may be registered with the apparatus and, thus, allowed to use the service.

In some embodiments, the service is established based on an authentication of the encryptor or the decryptor.

As discussed above, in some embodiments, the communications link to the decryptor is established automatically, the first encryption key and the second encryption key are obtained or received automatically and the third encryption key is generated automatically and the data payload is automatically encrypted and the encrypted data payload is automatically transmitted to the decryptor by the encryptor, for example, by executing software on the circuitry of the encryptor or by a combination of software executed on the circuitry and hardware functionality provided by the circuitry or by hardware functionality provided by the circuitry only.

As discussed above, in some embodiments, the communications link to the encryptor is established automatically, the first encryption key and the second encryption key are obtained or received automatically and the third encryption key is generated automatically and the encrypted data payload is automatically received and the encrypted data payload is automatically decrypted by the decryptor, for example, by executing software on the circuitry of the decryptor or by a combination of software executed on the circuitry and hardware functionality provided by the circuitry or by hardware functionality provided by the circuitry only.

Some embodiments pertain to a (corresponding) method for encrypting a data payload, wherein the method includes:
establishing a communications link to a decryptor for transmitting an encrypted data payload;
obtaining a first encryption key via a first channel and a second encryption key via a second channel different from the first channel;
encrypting a data payload based on a third encryption key generated based on the obtained first and second encryption key; and
transmitting the encrypted data payload to the decryptor.
The method may be performed by an encryptor as described herein.

Some embodiments pertain to a (corresponding) method for decrypting an encrypted data payload, wherein the method includes:
establishing a communications link to an encryptor for receiving an encrypted data payload;
obtaining a first encryption key via a third channel and a second encryption key via a fourth channel different from the third channel;
receiving the encrypted data payload; and
decrypting the received encrypted data payload based on a third encryption key generated based on the obtained first and second encryption key.
The method may be performed by a decryptor as described herein.

Some embodiments pertain to a communications method, wherein the communication method includes:
establishing a communications link between an encryptor and a decryptor;
obtaining, by the encryptor, a first encryption key via a first channel and a second encryption key via a second channel different from the first channel;
obtaining, by the decryptor, the first encryption key via a third channel and the second encryption key via a fourth channel different from the third channel;
encrypting a data payload based on a third encryption key generated based on the obtained first and second encryption key;
transmitting the encrypted data payload to the decryptor;
receiving the encrypted data payload; and
decrypting the received encrypted data payload based on the third encryption key generated based on the obtained first and second encryption key.
The communications method may be performed by the communications system as described herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, there is schematically illustrated in a block diagram in FIG. 1A an embodiment of a communications system 1-1 and in FIG. 1B an embodiment of a communications system 1-2, which are discussed in the following.

Referring to FIG. 1A, the communications system 1-1 includes an encryptor 2 and a decryptor 3 which communicate via (computer) network 4.

The communications system 1-1 further includes an apparatus 5 which includes a true random number generator 6.

Assuming that the encryptor 2 has a data payload to be transmitted via network 4 to the decryptor 3, e.g., a short message and the message is confidential such that encryptor 2 needs to encrypt the data payload before transmitting it over the network 4 to the decryptor 3 (via the message communications channel).

Both the encryptor 2 and the decryptor 3 have registered with the apparatus and indicated during registration that they want to communicate with each other in an encrypted form.

In some embodiments, the apparatus 5 generates with the random number generator 6 one or more first and second encryption keys and stores the generated first encryption keys on a first and third memory device and the generated second encryption keys on a second and fourth memory device.

An administrator of the apparatus 5 then issues the generated encryption keys to someone who is in charge of the encryptor 2 and the decryptor 3 by ordering a courier service such that delivering (a key communications channel) a memory device to the encryptor 2 or the decryptor 3 should be understood as delivering the respective memory device to the person in charge who then configures the encryptor 2 or the decryptor 3 with the respective encryption keys.

In other embodiments, the encryption keys are provided (automatically) to the encryptor 2 and decryptor 3 via an established communications link (a key communications channel).

A first courier, as a first channel 7, delivers the first memory device to the encryptor 2.

A second courier, as a second channel 8, delivers the second memory device to the encryptor 2.

A third courier, as a third channel 9, delivers the third memory device to the decryptor 3.

A fourth courier, as a fourth channel 10, delivers the fourth memory device to the decryptor 3.

The encryptor 2 is then able to use the first and second encryption keys obtained from the first and second memory devices to encrypt the data payload before transmitting it via the network 4 to the decryptor 3, which is able to decrypt the encrypted data payload with the first and second encryption keys obtained from the third and fourth memory devices.

Figure 2:
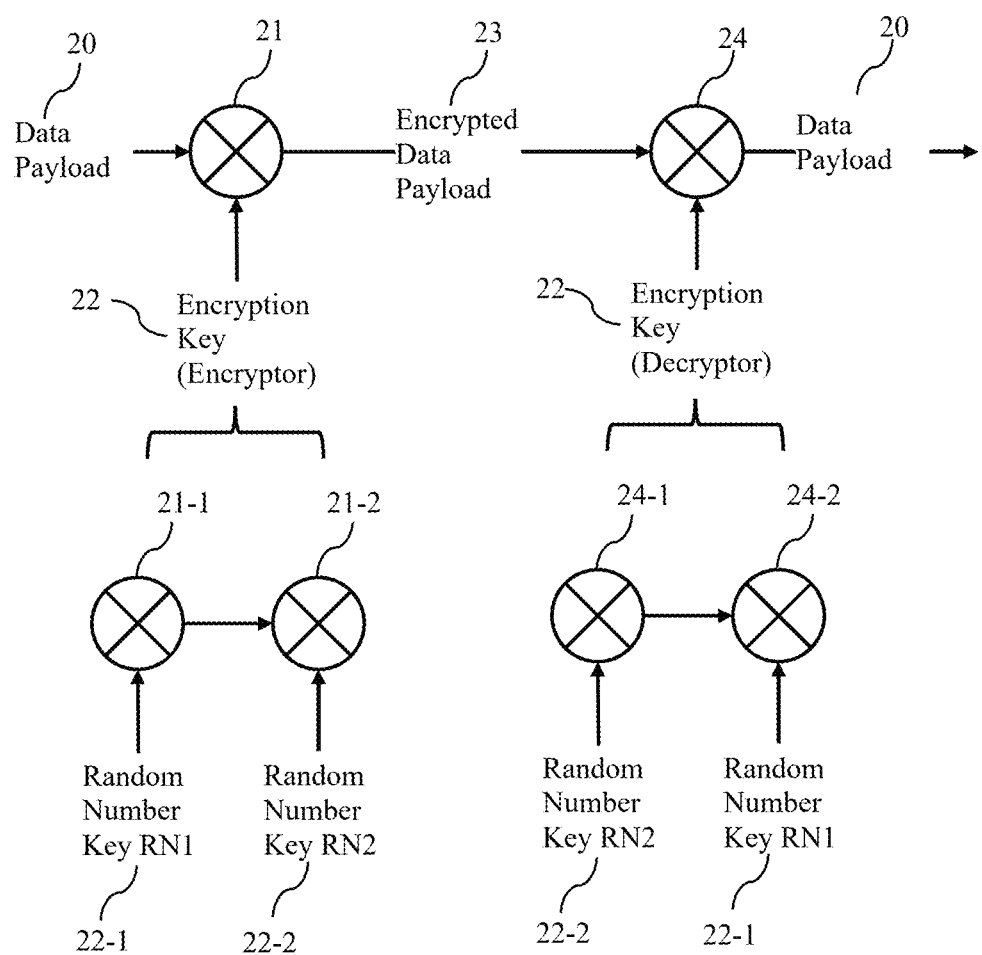
FIG. 2 schematically illustrates in a block diagram an embodiment of an encryption and decryption process.

An embodiment of an encryption and decryption process is schematically illustrated in FIG. 2, which is discussed in the following.

The data payload 20 is transformed by an exclusive-or transformation 21 using an encryption key 22 generated based on a first encryption key 22-1, a true random number key RN1, and a second encryption key 22-2, a true random number key RN2, wherein the first encryption key 22-1 and the second encryption key 22-2 are itself transformed by an exclusive-or transformation.

As illustrated in FIG. 2, the exclusive-or transformation 21, may be replaced by two consecutive exclusive-or transformations 21-1 and 21-2 in which the first encryption key 22-1 is used at first in the first exclusive-or transformation 21-1 and the second encryption key 22-2 is applied on this result in the second exclusive-or transformation 21-2.

Thus, the encryptor obtains encrypted data payload 23 and transmits it via the network 4 to the decryptor 3.

On the decryptor side, the encrypted data payload 23 is transformed by an exclusive-or transformation 24 using the encryption key 22 generated based on the first encryption key 22-1 and the second encryption key 22-2, wherein the first encryption key 22-1 and the second encryption key 22-2 are itself transformed by an exclusive-or transformation.

As illustrated in FIG. 2, the exclusive-or transformation 24, may be replaced by two consecutive exclusive-or transformations 24-1 and 24-2 in which the second encryption key 22-2 is used at first in the first exclusive-or transformation 24-1 and the first encryption key 22-1 is applied on this result in the second exclusive-or transformation 24-2.

Thus, the decryptor obtains the data payload 20.

Generally, as mentioned further above, the present disclosure may equally apply to more than two encryption keys based on which a data payload is encrypted. The two or more encryption keys may be received via different channels (or the same channel(s)).

Referring again to FIG. 1A, as mentioned above, the encryptor 2 may obtain more than one first encryption keys and more than one second encryption keys such that the decryptor 3 should be informed which first and which second encryption key is to be used.

Moreover, each of the first and second encryption keys may be rather long such that only a part of each of the first and second encryption key is used and, thus, the decryptor 3 should be informed which part of the first and second encryption is to be used.

Hence, the encryptor 2 may include encryption information in the transmission of the encrypted data payload, as will be discussed in the following under reference of FIG. 3 and FIG. 4.

Figure 3:
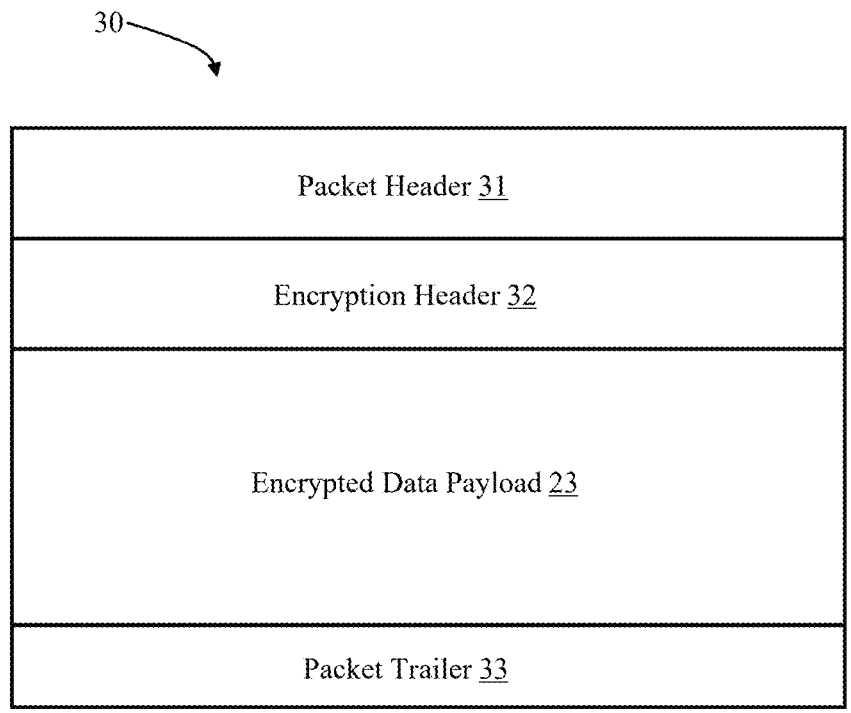
FIG. 3 schematically illustrates in a block diagram an embodiment of a packet used in embodiments of a communications system.

FIG. 3 schematically illustrates in a block diagram an embodiment of a packet 30 used in some embodiments of the communications system 1-1 and 1-2.

The packet 30 may be a known Ethernet or Internet Protocol (IP) packet including a packet header 31. Optionally, in some embodiments, the packet 30 includes a packet trailer 33 (which is, for instance, not used in an IP packet, but may be used in other network protocol stacks).

The data payload of the packet 30—e.g., of the IP packet—includes an encryption header 32 and the encrypted data payload 23 (see also FIG. 2).

The encryption header 32 includes the encryption information.

Figure 4:
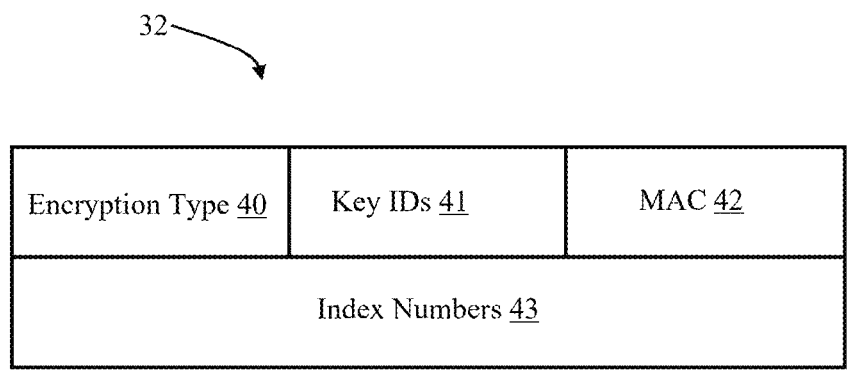
FIG. 4 schematically illustrates in a block diagram an embodiment of an encryption header.

FIG. 4 schematically illustrates in a block diagram an embodiment of the encryption header 32.

The encryption header 32 includes a first data element 40 identifying which type of encryption process is used for encrypting the data payload ("Encryption Type"), a second data element 41 identifying the first and second encryption key ("Key IDs"), a message authentication code 42 ("MAC"), and a third data element 43 identifying parts of the first and second encryption key to be used for generating the third encryption key ("Index Numbers").

The MAC 42 is computed. based on the contents of the other encryption header elements. The MAC 42 may be computed for just the encryption header 32 or for the entire data payload of the IP packet, i.e., the encryption header plus the encrypted data payload 23. Also, the MAC 42 may be added to the encrypted data payload 23 such that the entire decrypted data payload of the packet 30 can be verified and is not subject to a modification attack.

Referring again to FIG. 1A, in some embodiments, the apparatus 5 generates with the true random number generator 6 a first encryption key stream and a second encryption key stream such that continuously new key material is provided for encrypting a data stream.

In such embodiments, the first channel 7 is a second communications link, the second channel 8 is a third communications link, the third channel 9 is a fourth communications link and the fourth channel 10 is a fifth communications link.

Moreover, in such embodiments, as illustrated in FIG. 1B, the apparatus 5 may include two separate apparatuses 5-1 and 5-2 including true random number generators 6-1 and 6-2, respectively, such that the first apparatus 5-1 provides the first encryption key stream and the second apparatus 5-2 provides the second encryption key stream.

The apparatuses 5-1 and 5-2 may be connected with a fixed communications line 11 for determining the synchronization information to be included in the first and second encryption key stream.

Referring again to FIG. 1A, in the following it is assumed that the encryptor 2 is a mobile terminal and the decryptor 3 is a mobile terminal and the encryptor 2 transmit a data stream to the decryptor 3 which shall be encrypted using encryption key streams provided by apparatus 5 as a service. Moreover, it is assumed that both the encryptor 2 and the decryptor 3 have additionally wireless local area network available (private or public).

A corresponding communications method will be discussed in the following under reference of FIG. 1 and FIG. 5, which schematically illustrates in a flow diagram an embodiment of a communications method 50.

At 51, the encryptor 2 and the decryptor 3 establish a communications link (the message communications channel) via the network 4.

At 52, the encryptor 2 establishes a second or third communications link (a key communications channel) with the apparatus 5 (here KGC for "Key Generation Center").

At 53, the encryptor 2 authenticates with the KGC 5 and requests encryption key streams for communications with the decryptor 3.

At 54, the KGC 5 contacts, based on the request from the encryptor 2, the decryptor 3 and establishes a fourth or fifth communications link (a key communications channel) with the decryptor 3.

At 55, the KGC 5 further establishes a third or second communications link (a key communications channel) with the encryptor 2 and a fifth or fourth communications link (a key communications channel) with the decryptor 3.

Moreover, the KGC 5 and the encryptor 2 determine an encryption key for encrypting the communications (the key communications channel) between each other. As mentioned further above, for example, asymmetric methods may be used, e.g., the KGC 5 uses a public key of the encryptor 2 for encrypting messages sent to the encryptor 2.

Similarly, the KGC 5 and the decryptor 3 determine an encryption key for encrypting the communications (the key communications channel) between each other. As mentioned further above, for example, asymmetric methods may be used, e.g., the KGC 5 uses a public key of the decryptor 3 for encrypting messages sent to the decryptor 3.

In other embodiments, as mentioned above, a large PRN is typically generated based on a short key in combination with a complex algorithm. Hence, in some embodiments, for example, an administrator of the KGC 5 issues via courier service, e.g. after registration, a list of short keys to someone who is in charge of the at least one of the encryptor 2 and the decryptor 3 (e.g., on a memory device) such that the encryptor 2 and the decryptor 3 may generate a symmetric encryption key for communications with the KGC 5 on the fly.

In some embodiments, the short keys for generating the PRNs may be provided via one of the established key communications channel, wherein the short keys may be encrypted based on asymmetric encryption methods.

The complex algorithm to be used for generating the PRNs based on the short keys may be determined when one of the key communications channel is established between the encryptor 2 or the decryptor and the KGC 5.

The second communications link is established via a wireless local area network, the third communications link is established via a mobile telecommunications system, the fourth communications link is established via a wireless local area network, and the fifth communications link is established via a mobile telecommunications system.

Then, further at 55, the KGC 5 starts providing a first encryption key stream via the second and fourth communications link and a second encryption key stream via the third and fifth communications link.

In particular, the KGC 5 transmits a first encryption key and synchronization information to the encryptor 2 and the decryptor 3, and the KGC 5 transmits a second encryption key and synchronization information to the encryptor 2 and the decryptor 3.

At 56, the encryptor 2 encrypts a first data payload of a data stream with a third encryption key generated based on the obtained first and second encryption key and transmits it to the decryptor 3 together with encryption information via the message communications channel.

Figure 5:
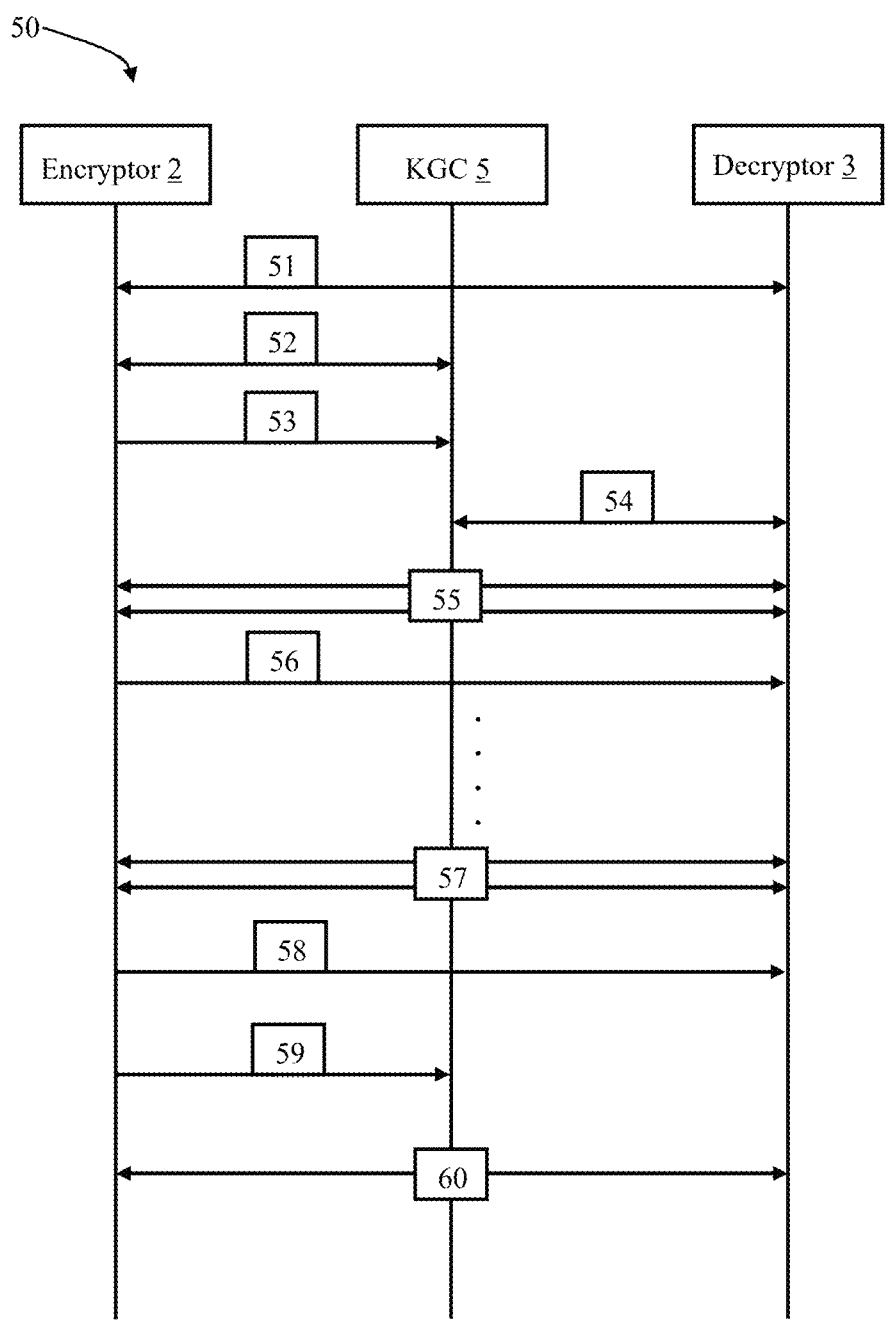
FIG. 5 schematically illustrates in a flow diagram an embodiment of a communications method.

This may be repeated until a last data payload of the data stream is to be transmitted at 58, as illustrated by the vertical dots in FIG. 5, wherein, at 57, the last first and second encryption keys are transmitted from the KGC 5 to the encryptor 2 and the decryptor 3 for encrypting the last data payload at 58.

Then, at 59, the encryptor 2 indicates to the KGC 5 that the encryption key stream may end.

At 60, the KGC 5 acknowledges termination of the encryption key stream.

Figure 6:
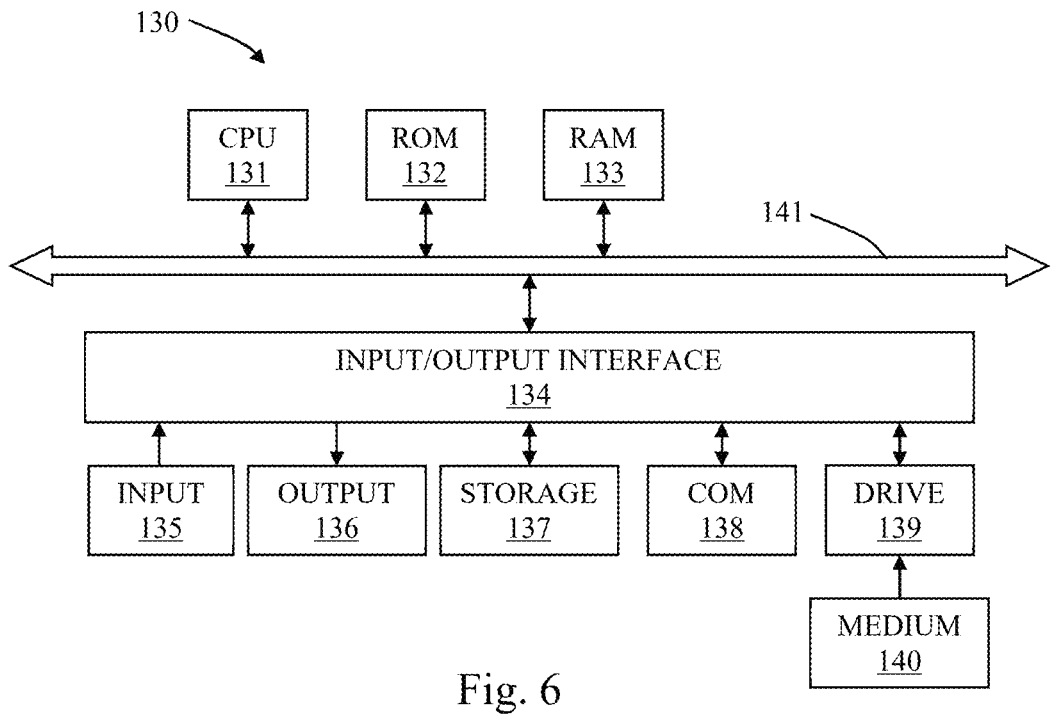
FIG. 6 schematically illustrates in a block diagram an embodiment of a multi-purpose computer which can be used for implementing an encryptor, a decryptor and an apparatus.

FIG. 6 schematically illustrates in a block diagram an embodiment of a multi-purpose computer 130 which can be used for implementing an encryptor, a decryptor and an apparatus.

The computer 130 can be implemented such that it can basically function as any type of encryptor, decryptor and apparatus as described herein. The computer has components 131 to 141, which can form a circuitry, such as any one of the circuitries of the encryptor, decryptor and apparatus as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random-access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and a person of ordinary skill in the art will appreciate that the computer 130 can be adapted and configured accordingly for meeting specific requirements which arise, when it functions as an encryptor, decryptor or apparatus.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a micro-phone, a camera, a touchscreen, etc.

The output 136 can have a display (liquid crystal display, cathode ray tube display, light emittance diode display, etc.), loudspeakers, etc.

The storage 137 can have a hard disk, a solid-state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR. Moreover, a true random number generator may be connected to the bus 141.

When the computer 130 functions as an encryptor, decryptor or apparatus, the communication interface 138 can further have a respective air interface (providing, e.g., E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

Figure 7:
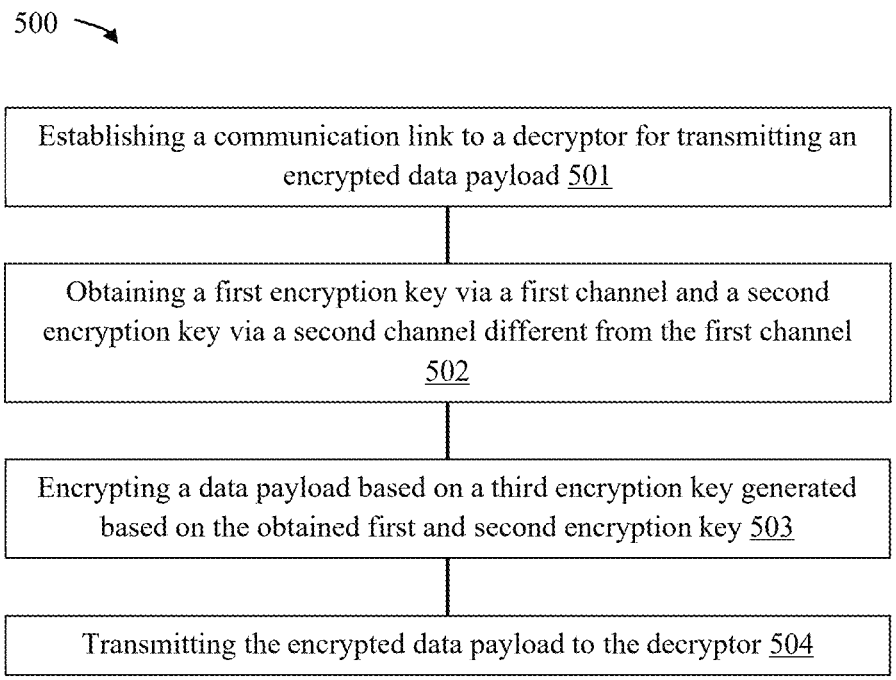
FIG. 7 schematically illustrates in a flow diagram an embodiment of a method for encrypting a data payload.

FIG. 7 schematically illustrates in a flow diagram an embodiment of a method 500 for encrypting a data payload.

The method 500 may be performed by the encryptor as described herein.

At 501, a communication link to a decryptor is established for transmitting an encrypted data payload, as discussed herein.

At 502, a first encryption key is obtained via a first channel and a second encryption key is obtained via a second channel different from the first channel, as discussed herein.

At 503, a data payload is encrypted based on a third encryption key generated based on the obtained first and second encryption key, as discussed herein.

At 504, the encrypted data payload is transmitted to the decryptor.

Figure 8:
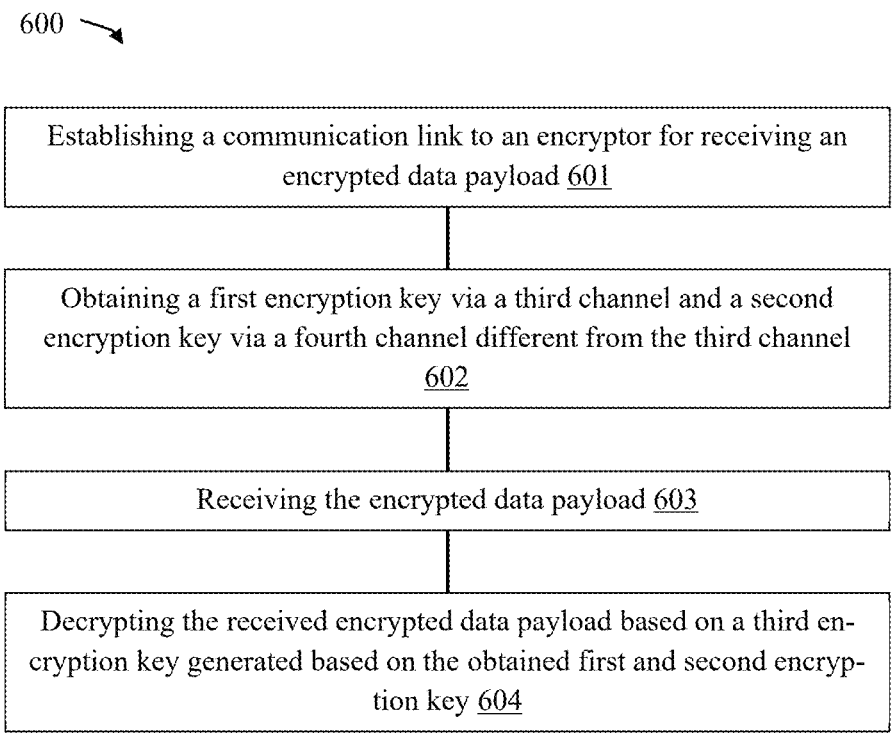
FIG. 8 schematically illustrates in a flow diagram an embodiment of a method for decrypting an encrypted data payload.

FIG. 8 schematically illustrates in a flow diagram an embodiment of a method 600 for decrypting an encrypted data payload.

The method may be performed by the decryptor as described herein.

At 601, a communication link is established to an encryptor for receiving an encrypted data payload, as discussed herein.

At 602, a first encryption key is obtained via a third channel and a second encryption key is obtained via a fourth channel different from the third channel, as discussed herein.

At 603, the encrypted data payload is received, as discussed herein.

At 604, the received encrypted data payload is decrypted based on a third encryption key generated based on the obtained first and second encryption key, as discussed herein.

Figure 9:
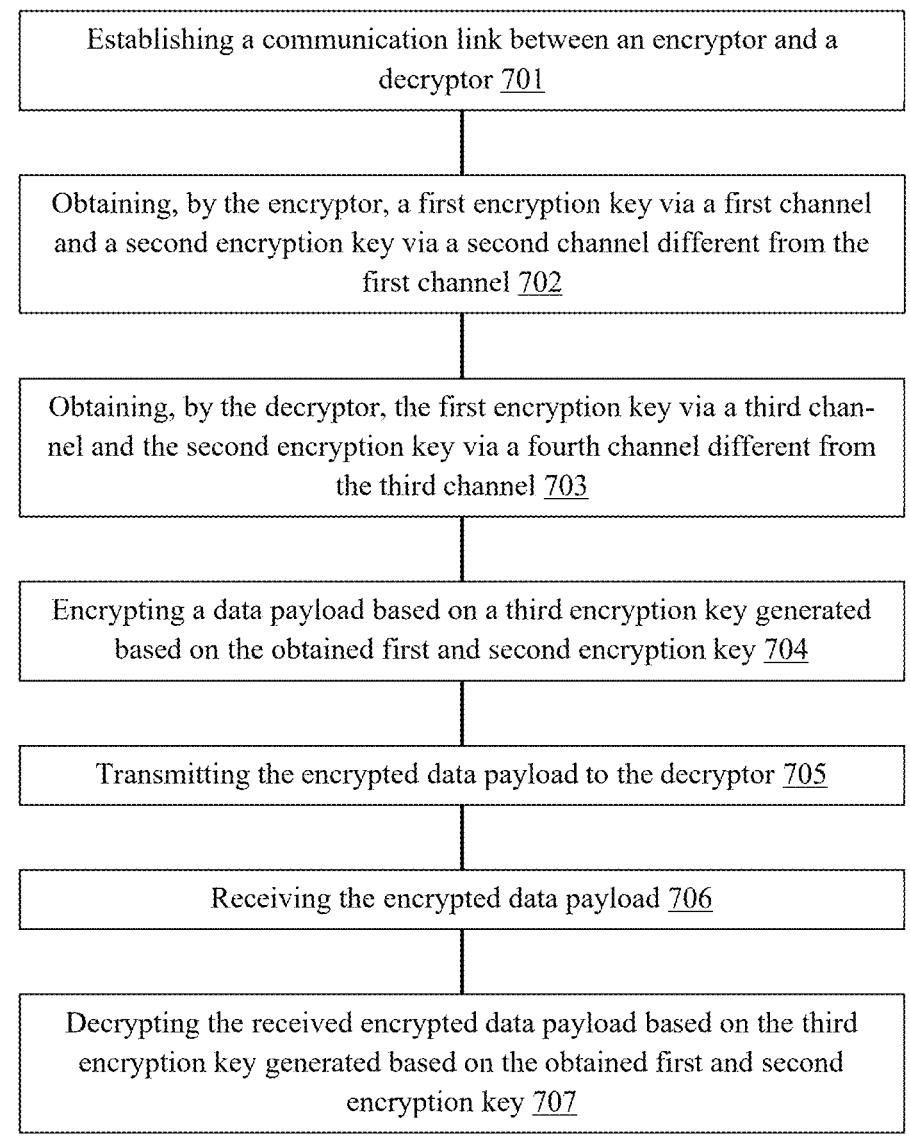
FIG. 9 schematically illustrates in a flow diagram an embodiment of a communications method.

FIG. 9 schematically illustrates in a flow diagram an embodiment of a communications method 700.

The method may be performed by the communications system as described herein.

At 701, a communication link is established between an encryptor and a decryptor, as discussed herein.

At 702, a first encryption key is obtained by the encryptor via a first channel and a second encryption key via a second channel different from the first channel, as discussed herein.

At 703, the first encryption key is obtained by the decryptor via a third channel and the second encryption key via a fourth channel different from the third channel, as discussed herein.

At 704, a data payload is encrypted based on a third encryption key generated based on the obtained first and second encryption key, as discussed herein.

At 705, the encrypted data payload is transmitted to the decryptor, as discussed herein.

At 706, the encrypted data payload is received, as discussed herein.

At 707, the received encrypted data payload is decrypted based on the third encryption key generated based on the obtained first and second encryption key, as discussed herein.

It should be recognized that the embodiments describe methods with an exemplary ordering of method steps. The specific ordering of method steps is however given for illustrative purposes only and should not be construed as binding.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

The present technology may also be configured as follows:

(1) An encryptor including circuitry configured to:
    establish a communications link to a decryptor for transmitting an encrypted data payload;
    obtain a first encryption key via a first channel and a second encryption key via a second channel different from the first channel;
    encrypt a data payload based on a third encryption key generated based on the obtained first and second encryption key; and
    transmit the encrypted data payload to the decryptor.

(2) The encryptor of (1), wherein the first encryption key includes a first true random bit distribution, and the second encryption key includes a second true random bit distribution.

(3) The encryptor of (1) or (2), wherein the third encryption key is generated based on an exclusive OR transformation of the first and second encryption key.

(4) The encryptor of anyone of (1) to (3), wherein the first and second encryption key have the same length as the data payload.

(5) The encryptor of anyone of (1) to (4), wherein the circuitry is further configured to include encryption information in the transmission of the encrypted data payload.

(6) The encryptor of (5), wherein the encryption information include at least one of: a first data element identifying which type of encryption process is used for encrypting the data payload, a second data element identifying the first and second encryption key, and a third data element identifying parts of the first and second encryption key to be used for generating the third encryption key.

(7) The encryptor of (5) or (6), wherein the encryption information include a message authentication code.

(8) The encryptor of anyone of (1) to (7), wherein the circuitry is further configured to establish a second communications link with an apparatus as the first or second channel for obtaining the first or the second encryption key, respectively.

(9) The encryptor of (8), wherein the circuitry is further configured to authenticate with the apparatus.

(10) The encryptor of anyone of (1) to (9), wherein the circuitry is further configured to establish a second communications link with an apparatus as the first channel and a third communications link with the apparatus as the second channel.

(11) The encryptor of (10), wherein the second communications link is established via a wireless local area network and the third communications link is established via a mobile telecommunications system.

(12) The encryptor of (10) or (11), wherein the data payload is part of a data stream, wherein the first encryption key is part of a first encryption key stream and the second encryption key is part of a second encryption key stream, and wherein the circuitry is further configured to:
  receive the first encryption key stream via the second communications link and the second encryption key stream via the third communications link from the apparatus;
  encrypt the data stream based on a third encryption key stream generated based on the first and second encryption key stream; and
  transmit the encrypted data stream to the decryptor.

(13) The encryptor of (12), wherein the circuitry is further configured to detect synchronization information in the first and second encryption key stream for obtaining, based on the synchronization information, encryption information to be included in the transmission of the encrypted data stream.

(14) The encryptor of anyone of (1) to (13), wherein the encryptor is a mobile terminal.

(15) A decryptor including circuitry configured to:
  establish a communications link to an encryptor for receiving an encrypted data payload;
  obtain a first encryption key via a third channel and a second encryption key via a fourth channel different from the third channel;
  receive the encrypted data payload; and
  decrypt the received encrypted data payload based on a third encryption key generated based on the obtained first and second encryption key.

(16) The decryptor of (15), wherein the first encryption key includes a first true random bit distribution, and the second encryption key includes a second true random bit distribution.

(17) The decryptor of (15) or (16), wherein the third encryption key is generated based on an exclusive OR transformation of the first and second encryption key.

(18) The decryptor of anyone of (15) to (17), wherein the first and second encryption key have the same length as the data payload.

(19) The decryptor of anyone of (15) to (18), wherein the circuitry is further configured to detect encryption information included in the received transmission of the encrypted data payload.

(20) The decryptor of (19), wherein the encryption information include at least one of: a first data element identifying which type of encryption process is used for encrypting the data payload, a second data element identifying the first and second encryption key, and a third data element identifying parts of the first and second encryption key to be used for generating the third encryption key.

(21) The decryptor of (19) or (20), wherein the encryption information include a message authentication code.

(22) The decryptor of anyone of (15) to (21), wherein the circuitry is further configured to establish a fourth communications link with an apparatus as the third or fourth channel for obtaining the first or second encryption key, respectively.

(23) The decryptor of (22), wherein the circuitry is further configured to authenticate with the apparatus.

(24) The decryptor of anyone of (15) to (23), wherein the circuitry is further configured to establish a fourth communications link with an apparatus as the third channel and a fifth communications link with the apparatus as the fourth channel.

(25) The decryptor of (24), wherein the fourth communications link is established via a wireless local area network and the fifth communications link is established via a mobile telecommunications system.

(26) The decryptor of (24) or (25), wherein the encrypted data payload is part of an encrypted data stream, wherein the first encryption key is part of a first encryption key stream and the second encryption key is part of a second encryption key stream, and wherein the circuitry is further configured to:
  receive the first encryption key stream via the fourth communications link and the second encryption key stream via the fifth communications link from the apparatus;
  receive the encrypted data stream; and
  decrypt the received encrypted data stream based on a third encryption key stream generated based on the first and second encryption key stream.

(27) The decryptor of (26), wherein the circuitry is further configured to detect synchronization information in the first and second encryption key stream to be used for processing encryption information included in the transmission of the encrypted data stream.

(28) The decryptor of anyone of (15) to (27), wherein the decryptor is a mobile terminal.

(29) A communications system, including:
  an encryptor including circuitry configured to:
    establish a communications link to a decryptor for transmitting an encrypted data payload,
    obtain a first encryption key via a first channel and a second encryption key via a second channel different from the first channel,
    encrypt a data payload based on a third encryption key generated based on the obtained first and second encryption key,
    transmit the encrypted data payload to the decryptor; and
  the decryptor including circuitry configured to:
    establish the communications link to the encryptor for receiving the encrypted data payload,
    obtain the first encryption key via a third channel and the second encryption key via a fourth channel different from the third channel,
    receive the encrypted data payload,
    decrypt the received encrypted data payload based on the third encryption key generated based on the obtained first and second encryption key.

(30) The communications system of 29, wherein the first encryption key includes a first true random bit distribution, and the second encryption key includes a second true random bit distribution.

(31) The communications system of (29) or (30), wherein the third encryption key is generated based on an exclusive OR transformation of the first and second encryption key.

(32) The communications system of anyone of (29) to (31), wherein the first and second encryption key have the same length as the data payload.

(33) The communications system of anyone of (29) to (32), wherein:
the circuitry of the encryptor is further configured to include encryption information in the transmission of the encrypted data payload; and
the circuitry of the decryptor is further configured to detect the encryption information included in the received transmission of the encrypted data payload.

(34) The communications system of (33), wherein the encryption information include at least one of: a first data element identifying which type of encryption process is used for encrypting the data payload, a second data element identifying the first and second encryption key, and a third data element identifying parts of the first and second encryption key to be used for generating the third encryption key.

(35) The communications system of (33) or (34), wherein the encryption information includes a message authentication code.

(36) The communications system of anyone of (29) to (35), further including:
an apparatus including circuitry configured to:
establish a second communications link with the encryptor as the first or second channel to provide the first or second encryption key, respectively,
establish a fourth communications link with the decryptor as the third or fourth channel to provide the first or second encryption key, respectively.

(37) The communications system of (36), wherein:
the circuitry of the encryptor is further configured to authenticate with the apparatus; and
the circuitry of the decryptor is further configured to authenticate with the apparatus.

(38) The communications system of anyone of (29) to (37), further including:
an apparatus comprising circuitry configured to:
establish a second communications link with the encryptor as the first channel and a third communications link with encryptor as the second channel,
establish a fourth communications link with the decryptor as the third channel and a fifth communications link with the decryptor as the fourth channel.

(39) The communications system of (38), wherein the second communications link is established via a wireless local area network, the third communications link is established via a mobile telecommunications system, the fourth communications link is established via a wireless local area network, and the fifth communications link is established via a mobile telecommunications system.

(40) The communications system of (38) or (39), wherein the data payload is part of a data stream, wherein the first encryption key is part of a first encryption key stream and the second encryption key is part of a second encryption key stream, and wherein:
the circuitry of the apparatus is further configured to:
provide a first encryption key stream to the encryptor via the second communications link and to the decryptor via the fourth communications link,
provide a second encryption key stream to the encryptor via the third communications link and to the decryptor via the fifth communications link;
the circuitry of the encryptor is further configured to:
receive the first encryption key stream via the second communications link and the second encryption key stream via the third communications link from the apparatus,
encrypt the data stream based on a third encryption key stream generated based on the first and second encryption key stream,
transmit the encrypted data stream to the decryptor; and
the circuitry of the decryptor is further configured to:
receive the first encryption key stream via the fourth communications link and the second encryption key stream via the fifth communications link from the apparatus,
receive the encrypted data stream,
decrypt the received encrypted data stream based on a third encryption key stream generated based on the first and second encryption key stream.

(41) The communications system of (40), wherein:
the circuitry of the apparatus is further configured to include synchronization information in the first and second encryption key stream to be used for obtaining encryption information by the encryptor and for processing the encryption information by the decryptor;
the circuitry of the encryptor is further configured to detect the synchronization information in the first and second encryption key stream for obtaining, based on the synchronization information, encryption information to be included in the transmission of the encrypted data stream; and
the circuitry of the decryptor is further configured to detect synchronization information in the first and second encryption key stream to be used for processing encryption information included in the transmission of the encrypted data stream.

(42) The communications system of (41), wherein the synchronization information includes multiple synchronization indications according to at least one of a predetermined timing pattern and a code pattern.

(43) The communications system of anyone of (38) to (42), wherein the apparatus includes a first apparatus establishing the second and fourth communications link and a different separate second apparatus establishing the third and fifth communications link.

(44) The communications system of anyone of (29) to (43), wherein the encryptor is a mobile terminal.

(45) The communications system of anyone of (29) to (44), wherein the decryptor is a mobile terminal.

(46) The communications system of anyone of (36) to (45), wherein the circuitry of the apparatus is further configured to generate true random numbers.

(47) The communications system of (46), wherein the true random numbers are generated by controlling at least one true random number generator.

(48) The communications system of (47), wherein the true random number generator is configured to generate the true random number based on a physical process.

(49) The communications system of (48), wherein the physical process includes at least one of: thermal noise, photoelectric effect, quantum phenomenon.

(50) The communications system of anyone of (40) to (49), wherein the first and second encryption key stream is generated based on the at least one true random number generator.

(51) The communications system of anyone of (36) to (50), wherein communications between the apparatus and at least one of the encryptor and the decryptor is encrypted.

(52) The communications system of anyone of (40) to (51), wherein the circuitry of the apparatus is further configured to provide the first and second encryption key stream as a service.

(53) The communications system of (52), wherein the service is established based on an authentication of the encryptor or the decryptor.

(54) A method for encrypting a data payload, including:
establishing a communications link to a decryptor for transmitting an encrypted data payload;
obtaining a first encryption key via a first channel and a second encryption key via a second channel different from the first channel;
encrypting a data payload based on a third encryption key generated based on the obtained first and second encryption key; and
transmitting the encrypted data payload to the decryptor.

(55) A method for decrypting an encrypted data payload, including:
establishing a communications link to an encryptor for receiving an encrypted data payload;
obtaining a first encryption key via a third channel and a second encryption key via a fourth channel different from the third channel;
receiving the encrypted data payload; and
decrypting the received encrypted data payload based on a third encryption key generated based on the obtained first and second encryption key.

(56) A communications method, including:
establishing a communications link between an encryptor and a decryptor;
obtaining, by the encryptor, a first encryption key via a first channel and a second encryption key via a second channel different from the first channel;
obtaining, by the decryptor, the first encryption key via a third channel and the second encryption key via a fourth channel different from the third channel;
encrypting a data payload based on a third encryption key generated based on the obtained first and second encryption key;
transmitting the encrypted data payload to the decryptor;
receiving the encrypted data payload; and
decrypting the received encrypted data payload based on the third encryption key generated based on the obtained first and second encryption key.

The invention claimed is:

1. A computer communications system, comprising:
an encryptor including circuitry configured to:
establish a communications link to a decryptor for transmitting an encrypted data payload,
obtain a first encryption key via a first channel and a second encryption key via a second channel different from the first channel,
encrypt a data payload based on a third encryption key generated based on the obtained first and second encryption key,
transmit the encrypted data payload to the decryptor; and
the decryptor including circuitry configured to:
establish the communications link to the encryptor for receiving the encrypted data payload,
obtain the first encryption key via a third channel and the second encryption key via a fourth channel different from the third channel,
receive the encrypted data payload, and
decrypt the received encrypted data payload based on the third encryption key generated based on the obtained first and second encryption key, and
an apparatus including circuitry configured to:
establish a second communications link with the encryptor as the first or second channel to provide the first or second encryption key, respectively,
establish a fourth communications link with the decryptor as the third or fourth channel to provide the first or second encryption key, respectively.

2. The computer communications system of claim 1, wherein the first encryption key includes a first true random bit distribution, and the second encryption key includes a second true random bit distribution.

3. The computer communications system of claim 1, wherein the third encryption key is generated based on an exclusive OR transformation of the first and second encryption key.

4. The computer communications system of claim 1, wherein the first and second encryption key have the same length as the data payload.

5. The computer communications system of claim 1, wherein:
the circuitry of the encryptor is further configured to include encryption information in the transmission of the encrypted data payload; and
the circuitry of the decryptor is further configured to detect the encryption information included in the received transmission of the encrypted data payload.

6. The computer communications system of claim 5, wherein the encryption information includes at least one of: a first data element identifying which type of encryption process is used for encrypting the data payload, a second data element identifying the first and second encryption key, and a third data element identifying parts of the first and second encryption key to be used for generating the third encryption key.

7. The computer communications system of claim 5, wherein the encryption information includes a message authentication code.

8. The computer communications system of claim 1, wherein:
the circuitry of the encryptor is further configured to authenticate with the apparatus; and
the circuitry of the decryptor is further configured to authenticate with the apparatus.

9. The computer communications system of claim 1, wherein the encryptor is a mobile terminal.

10. The computer communications system of claim 1, wherein the decryptor is a mobile terminal.

11. The computer communications system of claim 1, wherein the circuitry of the apparatus is further configured to generate true random numbers.

12. The computer communications system of claim 11, wherein the true random numbers are generated by controlling at least one true random number generator.

13. The computer communications system of claim 12, wherein the true random number generator is configured to generate the true random number based on a physical process.

14. The computer communications system of claim 13, wherein the physical process includes at least one of: thermal noise, photoelectric effect, quantum phenomenon.

15. The computer communications system of claim 1, wherein communications between the apparatus and at least one of the encryptor and the decryptor is encrypted.

16. The computer communications system of claim 15, wherein the service is established based on an authentication of the encryptor or the decryptor.

17. A computer communications system, comprising:
an encryptor including circuitry configured to:
establish a communications link to a decryptor for transmitting an encrypted data payload,
obtain a first encryption key via a first channel and a second encryption key via a second channel different from the first channel,
encrypt a data payload based on a third encryption key generated based on the obtained first and second encryption key,
transmit the encrypted data payload to the decryptor; and
the decryptor including circuitry configured to:
establish the communications link to the encryptor for receiving the encrypted data payload,
obtain the first encryption key via a third channel and the second encryption key via a fourth channel different from the third channel,
receive the encrypted data payload,
decrypt the received encrypted data payload based on the third encryption key generated based on the obtained first and second encryption key, and
an apparatus comprising circuitry configured to:
establish a second communications link with the encryptor as the first channel and a third communications link with encryptor as the second channel,
establish a fourth communications link with the decryptor as the third channel and a fifth communications link with the decryptor as the fourth channel.

18. The computer communications system of claim 17, wherein the second communications link is established via a wireless local area network, the third communications link is established via a mobile telecommunications system, the fourth communications link is established via a wireless local area network, and the fifth communications link is established via a mobile telecommunications system.

19. The computer communications system of claim 17, wherein the data payload is part of a data stream, wherein the first encryption key is part of a first encryption key stream, and the second encryption key is part of a second encryption key stream, and wherein:
the circuitry of the apparatus is further configured to:
provide a first encryption key stream to the encryptor via the second communications link and to the decryptor via the fourth communications link,
provide a second encryption key stream to the encryptor via the third communications link and to the decryptor via the fifth communications link;
the circuitry of the encryptor is further configured to:
receive the first encryption key stream via the second communications link and the second encryption key stream via the third communications link from the apparatus,
encrypt the data stream based on a third encryption key stream generated based on the first and second encryption key stream,
transmit the encrypted data stream to the decryptor; and
the circuitry of the decryptor is further configured to:
receive the first encryption key stream via the fourth communications link and the second encryption key stream via the fifth communications link from the apparatus,
receive the encrypted data stream,
decrypt the received encrypted data stream based on a third encryption key stream generated based on the first and second encryption key stream.

20. The computer communications system of claim 19, wherein:
the circuitry of the apparatus is further configured to include synchronization information in the first and second encryption key stream to be used for obtaining encryption information by the encryptor and for processing the encryption information by the decryptor;
the circuitry of the encryptor is further configured to detect the synchronization information in the first and second encryption key stream for obtaining, based on the synchronization information, encryption information to be included in the transmission of the encrypted data stream; and
the circuitry of the decryptor is further configured to detect synchronization information in the first and second encryption key stream to be used for processing encryption information included in the transmission of the encrypted data stream.

21. The computer communications system of claim 20, wherein the synchronization information includes multiple synchronization indications according to at least one of a predetermined timing pattern and a code pattern.

22. The computer communications system of claim 19, wherein the first and second encryption key stream is generated based on the at least one true random number generator.

23. The computer communications system of claim 19, wherein the circuitry of the apparatus is further configured to provide the first and second encryption key stream as a service.

24. The computer communications system of claim 17, wherein the apparatus includes a first apparatus establishing the second and fourth communications link and a different separate second apparatus establishing the third and fifth communications link.

25. A computer communications method, comprising:
establishing a first communications link between an encryptor and a decryptor;
obtaining, by the encryptor, a first encryption key via a first channel and a second encryption key via a second channel different from the first channel;
obtaining, by the decryptor, the first encryption key via a third channel and the second encryption key via a fourth channel different from the third channel;
encrypting a data payload based on a third encryption key generated based on the obtained first and second encryption key;
transmitting the encrypted data payload to the decryptor;
receiving the encrypted data payload;
decrypting the received encrypted data payload based on the third encryption key generated based on the obtained first and second encryption key;
establishing a second communications link with the encryptor as the first or second channel to provide the first or second encryption key, respectively; and
establishing a fourth communications link with the decryptor as the third or fourth channel to provide the first or second encryption key, respectively.

26. A computer communications method, comprising:
establishing a first communications link between an encryptor and a decryptor;
obtaining, by the encryptor, a first encryption key via a first channel and a second encryption key via a second channel different from the first channel;

obtaining, by the decryptor, the first encryption key via a third channel and the second encryption key via a fourth channel different from the third channel;

encrypting a data payload based on a third encryption key generated based on the obtained first and second encryption key;

transmitting the encrypted data payload to the decryptor;

receiving the encrypted data payload;

decrypting the received encrypted data payload based on the third encryption key generated based on the obtained first and second encryption key;

establishing a second communications link with the encryptor as the first channel and a third communications link with encryptor as the second channel; and establishing a fourth communications link with the decryptor as the third channel and a fifth communications link with the decryptor as the fourth channel.

* * * * *